US012481249B2

(12) United States Patent
Mallet et al.

(10) Patent No.: US 12,481,249 B2
(45) Date of Patent: Nov. 25, 2025

(54) METHOD FOR PRODUCING AN ASSEMBLY OF AN ELASTIC HOLDING MEMBER-TIMEPIECE COMPONENT ASSEMBLY WITH A SUPPORT ELEMENT

(71) Applicant: Nivarox-FAR S.A., Le Locle (CH)

(72) Inventors: Daniel Mallet, Le Belieu (FR); Frédéric Vaucher, La Chaux-de-Fonds (CH); Pierre Cusin, Villars-Burquin (CH)

(73) Assignee: Nivarox-FAR S.A., Le Locle (CH)

( * ) Notice: Subject to any disclaimer, the term of this patent is extended or adjusted under 35 U.S.C. 154(b) by 423 days.

(21) Appl. No.: 17/630,394

(22) PCT Filed: Jul. 21, 2020

(86) PCT No.: PCT/EP2020/070555
§ 371 (c)(1),
(2) Date: Jan. 26, 2022

(87) PCT Pub. No.: WO2021/032388
PCT Pub. Date: Feb. 25, 2021

(65) Prior Publication Data
US 2022/0283544 A1 Sep. 8, 2022

(30) Foreign Application Priority Data
Aug. 16, 2019 (EP) .................................... 19192158

(51) Int. Cl.
*G04B 17/34* (2006.01)
*G04B 13/02* (2006.01)

(52) U.S. Cl.
CPC ......... *G04B 17/345* (2013.01); *G04B 13/022* (2013.01)

(58) Field of Classification Search
CPC .................................................. G04B 13/022
See application file for complete search history.

(56) References Cited

U.S. PATENT DOCUMENTS

2011/0005055 A1 1/2011 Gigandet et al.
2014/0313869 A1 10/2014 Cattiau
(Continued)

FOREIGN PATENT DOCUMENTS

CN 104122781 A 10/2014
CN 104656407 A 5/2015
(Continued)

OTHER PUBLICATIONS

Translation of EP2637066, Espacenet (Year: 2013).*
(Continued)

*Primary Examiner* — Renee S Luebke
*Assistant Examiner* — Matthew Daniel Hwang
(74) *Attorney, Agent, or Firm* — Oblon, McClelland, Maier & Neustadt, L.L.P.

(57) ABSTRACT

A method produces an assembly of an elastic holding member-timepiece component assembly with a support element. The elastic holding member is made of an electrically insulating material and the support element is made of an electrically conductive material. The method includes mounting the assembly with the support element aiming to define at least one zone for receiving at least one element for blocking a movement of the holding member relative to the support element, and producing by galvanic metal growth the at least one blocking element on at least one of the reception zones.

14 Claims, 3 Drawing Sheets

(56) References Cited

U.S. PATENT DOCUMENTS

| | | | | |
|---|---|---|---|---|
| 2017/0220004 | A1* | 8/2017 | Bossart | B81C 99/0085 |
| 2019/0107809 | A1* | 4/2019 | Conus | G04D 3/0069 |

FOREIGN PATENT DOCUMENTS

| | | | |
|---|---|---|---|
| EP | 2 273 322 | A1 | 1/2011 |
| EP | 2 637 066 | A2 | 9/2013 |
| EP | 2 796 940 | A2 | 10/2014 |
| JP | 2011-17701 | A | 1/2011 |
| JP | 2014-215297 | A | 11/2014 |

OTHER PUBLICATIONS

Combined Chinese Office Action and Search Report issued Dec. 20, 2023, in corresponding Chinese Patent Application No. 202080059588.1 (with English Translation and English Translation of Category of Cited Documents), 16 pages.

International Search Report issued on Oct. 7, 2020 in PCT/EP2020/070555 filed on Jul. 21, 2020, 2 pages.

Office Action issued Jun. 2, 2022, in corresponding Indian Patent Application No. 202247007637 (with English Translation), 5 pages.

Japanese Office Action issued on Jan. 4, 2023 in Japanese Patent Application No. 2021-576313 (with English translation), 5 pages.

Combined Chinese Office Action and Search Report issued on Feb. 13, 2023 in Chinese Patent Application No. 202080059588.1 (with English translation of Office Action), 17 pages.

* cited by examiner

METHOD FOR PRODUCING AN ASSEMBLY OF AN ELASTIC HOLDING MEMBER-TIMEPIECE COMPONENT ASSEMBLY WITH A SUPPORT ELEMENT

CROSS-REFERENCE TO RELATED APPLICATION

The present application is a national stage entry of International Application No. PCT/EP2020/070555, filed Jul. 21, 2020, which claims priority to European Patent Application Ser. No. 19/192,158.4, filed on Aug. 16, 2019, the entire content and disclosure of which are incorporated by reference herein.

TECHNICAL FIELD

The invention relates to a method for producing an assembly of an elastic holding member-timepiece component assembly with a support element.

The invention also relates to such an assembly and to this elastic holding member-timepiece component assembly.

Finally, the invention relates to a horological movement comprising this assembly as well as to a timepiece comprising such a movement.

TECHNOLOGICAL BACKGROUND

In the prior art, methods for producing assemblies of an elastic holding member-timepiece component assembly with a support element are known, wherein the holding member may be for example a collet and the support element a balance shaft. Traditionally, in these methods, the mounting of these two parts formed by this assembly and the support element, is carried out according to a well-known driving technique.

Nevertheless, the use in the scope of the production of such assemblies of new so-called "fragile" materials that are devoid of plastic deformation properties, has made the implementation of new mounting techniques necessary because these parts thus manufactured from these new materials cannot be driven due to the fact that they break easily.

Other methods more adapted to the production of assemblies made of these new materials are also known, which generally provide during operations of mounting such an assembly on the support element from the holding member, a step of axial, radial and rotational blocking/fastening of the holding member in relation to the support element.

However, one of the major drawbacks of such methods is related to the fact that they require many complex operations for carrying out this step of blocking the holding member in relation to the support element, such as operations of gluing contact surfaces to one another of the latter and operations of holding the position of this holding member relative to the support element during the drying of the glue.

The aim of the invention is to propose an alternative to the existing methods.

SUMMARY OF THE INVENTION

To this end, the invention relates to a method for producing an assembly of an elastic holding member-timepiece component with a support element, said elastic holding member being made of an electrically insulating material and said support element being made of an electrically conductive material, the method comprising the following steps:

- mounting said assembly with the support element delimiting on the peripheral wall of this support element at least one zone for receiving at least one element for blocking a movement of said holding member relative to the support element, and
- producing by galvanic metal growth said at least one blocking element on at least one of said reception zones.

Thus such features make it possible to propose a method for producing such an assembly easy to implement in an industrial process particularly thanks to a simplification of an operation of mounting a holding member on a support element that no longer requires a specific placing of such a member against the seat of the axis of the support element.

In other embodiments:

- the mounting step comprises a sub-step of inserting the support element into the holding member of the assembly with a non-blocked holding of the support element (3) in this holding member (1);
- the insertion sub-step comprises a phase of elastic tightening of the support element in the holding member aiming to produce contact interfaces between the holding member and this support element;
- the production step comprises a sub-step of determining the location of said at least one zone for receiving at least one blocking element in a mounting zone of the support element;
- the determination sub-step comprises a phase of identifying zones for delimiting the contact interfaces;
- the production step comprises a sub-step of constructing by galvanic metal growth said at least one blocking element in at least one reception zone located in the mounting zone of the support element comprising at least one identified delimitation zone;
- the construction sub-step comprises a phase of building by galvanic metal growth said at least one blocking element in at least one reception zone located in the mounting zone of the support element comprising identified zones for delimiting two contact interfaces, these delimitation zones being arranged facing one another;
- the construction sub-step comprises a phase of forming by galvanic metal growth said at least one blocking element in at least one reception zone located in the mounting zone of the support element comprising at least one identified zone for delimiting at least one contact interface, said at least one delimitation zone being arranged facing one of the two ends of the support element.

The invention also relates to an assembly for a horological movement of a timepiece comprising an elastic holding member-timepiece component assembly and a support element, said elastic holding member being made of an electrically insulating material and the support element made of an electrically conductive material, the assembly (120) being coupled with the support element from at least one blocking element included on at least one reception zone of the support element.

The invention also relates to a horological movement comprising at least one such assembly.

The invention also relates to a timepiece comprising such a horological movement.

BRIEF DESCRIPTION OF THE FIGURES

The invention will be described hereafter in more detail using the appended drawings, given by way of non-limiting examples, wherein.

DETAILED DESCRIPTION OF THE INVENTION

Figure 1:
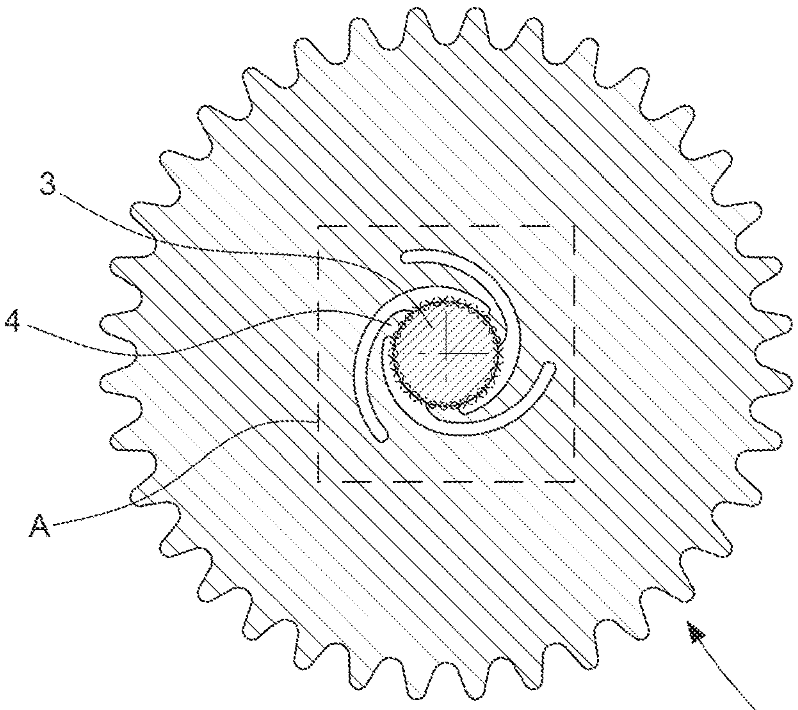
FIG. 1 represents a sectional view of an assembly comprising an elastic holding member-timepiece component assembly coupled to a support element, the assembly forming a toothed wheel integral with the holding member, according to the embodiment of the invention.
Figure 2:
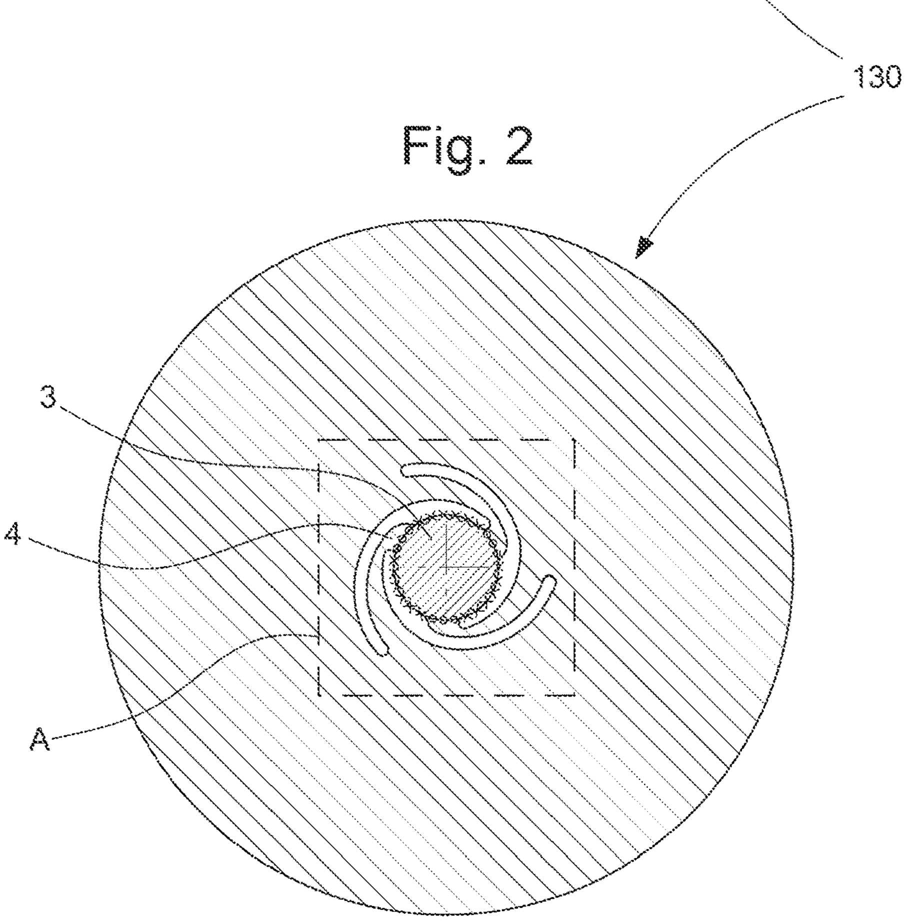
FIG. 2 represents a sectional view of an assembly comprising an elastic holding member-timepiece component assembly coupled to a support element, the assembly forming a wheel integral with the holding member, according to the embodiment of the invention.
Figure 3:
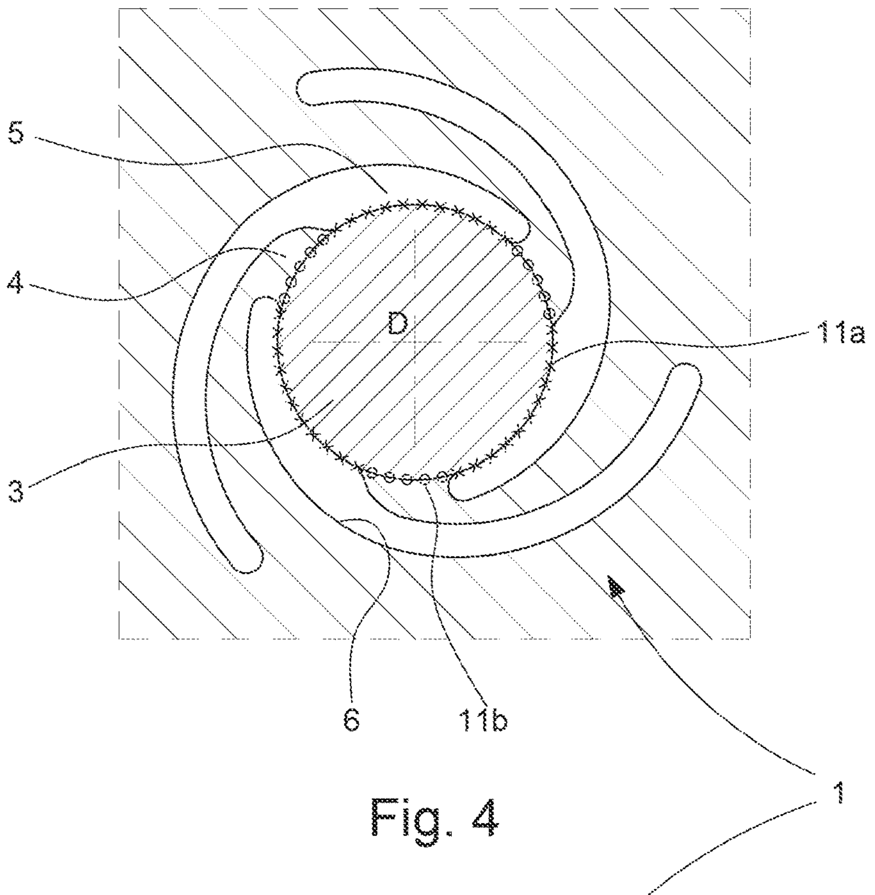
FIG. 3 represents a larger scale view of a portion A of the assembly illustrated in FIGS. 1 and 2 comprising elements for blocking the holding member relative to the support element, according to one embodiment of the invention.
Figure 4:
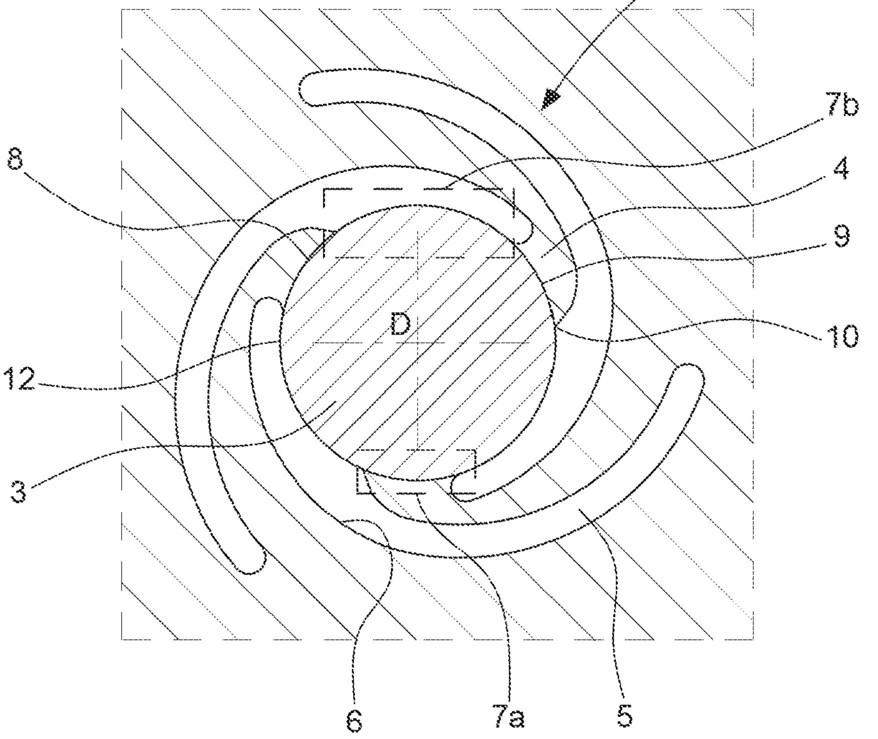
FIG. 4 represents a view of this same portion A of the assembly illustrated in FIGS. 1 and 2 devoid of these blocking elements, according to the embodiment of the invention.
Figure 5:
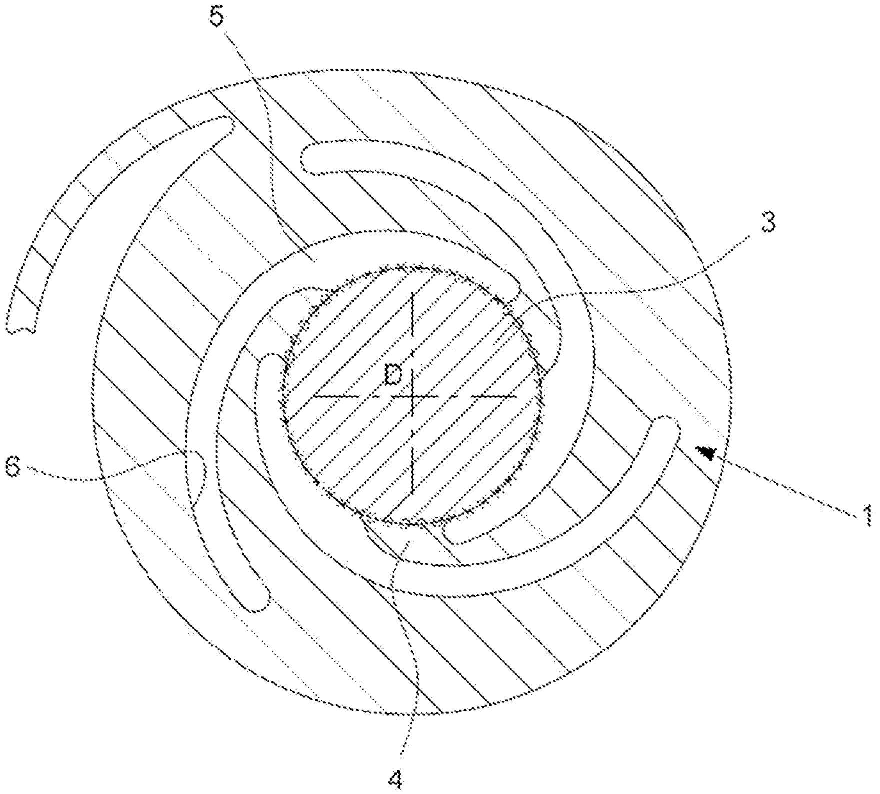
FIG. 5 represents a sectional view of an assembly comprising an elastic holding member-timepiece component assembly coupled to the support element, the elastic holding member being a collet and the timepiece component a balance-spring, according to one embodiment of the invention.
Figure 6:
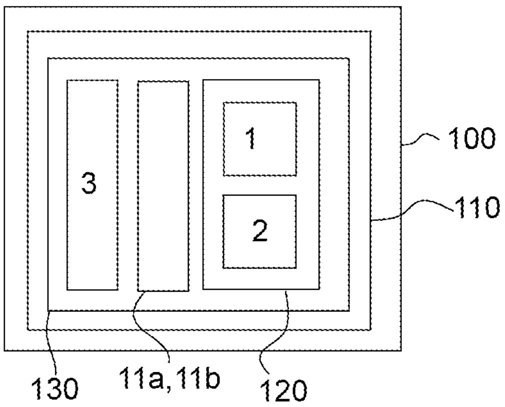
FIG. 6 is a schematic view of a timepiece comprising the assembly including the elastic holding member-timepiece component assembly coupled to the support element, according to the embodiment of the invention.

FIGS. 1 to 5 show one embodiment of an assembly 130 comprising an elastic holding member-timepiece component assembly coupled to the support element 3 from at least one blocking element 11*a*, 11*b* provided to radially, axially and/or rotationally block/lock the support element 3 relative to the holding member 1. In this context, it will be noted that the elastic holding member has the sole function of ensuring the centring of the assembly. Such a blocking element 11*a*, 11 *b* is built on at least one reception zone 7*a*, 7*b* of the support element 3 by galvanic metal growth. It is therefore understood that this blocking element 11*a*, 11 *b* is an excrescence of metal material present on a peripheral wall of an end of the support element 3 obtained by galvanic metal deposition or metal growth on this reception zone 7*a*, 7*b*. The assembly 130 therefore comprises the elastic holding member-timepiece component assembly 120 provided to be arranged in a horological movement 110 of a timepiece 100 as seen in FIG. 6, and also to be mounted on a support element 3. This assembly 120 comprises the elastic holding member 1 for fastening a timepiece component 2 on the support element 3. By way of example, the elastic holding member 1 may be a ring or also a collet or any parts able to ensure the fastening of the timepiece component 2 such as a balance-spring or also a wheel, to a support element 3 such as a shaft. This elastic holding member 1 is made of an electrically insulating material that may be so-called "fragile" material preferably a micro-machinable material. Such a material may comprise quartz, corundum, ceramic, silicon carbide (Sic), diamond, metallic glass or also a material at least partially amorphous or similar. In this configuration, the assembly 120 may be a one-piece part and be made in a "fragile" material similar to that of the holding member 1. It will be noted that in one variant of this assembly 120, only the elastic holding member 1 may be made of such a so-called "fragile" material, the timepiece component 2 then being manufactured in another material that is electrically insulating or not.

It will be noted that the assembly 130 here has been conceived for applications in the watchmaking field. Nevertheless, this assembly 130 may perfectly be implemented in other fields such as aeronautics, jewellery, or also automotive.

In this assembly 130, the holding member 1 comprises an upper face and a lower face preferably flat that are both respectively included in first and second planes P1 and P2. This member 1 also has a thickness that extends from the upper face to the lower face. In this holding member 1, the inner face 6 contributes to defining a volume 5 wherein are arranged at least three elastic arms 4 provided with free ends. Indeed, these elastic arms 4 each comprise two ends, a first end connected to the inner face 6 of the holding member 1 and a second end that is the free end. This free end comprises a contact face having a shape configured/adapted to cooperate with a corresponding contact portion 9 of a mounting zone 12 of the support element 3. By way of example in the present embodiment, when this mounting zone 12 is defined on a portion of the support element 3 having a circular-shaped section then the contact face of the arm has a compatible shape able to contour the shape of this portion by being for example here a curved contact face. This support element 3 comprises at least as many contact portions 9 as the holding member 1 comprises elastic arms 4. The free ends of these arms 4 together define an opening wherein is likely to be inserted said support element 3. In this configuration, the contact faces of the free ends of these arms 4 form an inner wall of this opening. Such an opening has a section that is lower than that of the mounting zone 12 included in an end of the support element 3 that is provided to be arranged therein.

In this assembly 130, it will be noted that each arm 4 has an essentially curved or straight shape with the free end forming the portion of the arm 4 the closest to a central axis D of the opening. Each of these elastic arms 4 is able to be deformed eccentrically relative to this central axis D of the opening. In other words, each of these arms 4 when it is subjected to a stress induced by the support element 3 as will be seen subsequently, is able to be deformed by passing from a rest position to a stressed position. In this context, by passing from this rest position to the stressed position, all or part of this arm 4 is then moved eccentrically relative to the central axis D and this, towards the inner face 6 of the holding member 1. Such arms 4 help to ensure an elastic tightening of the support element 3 in the opening with a minimal adjustment by being configured to be deformed eccentrically relative to the central axis D of said opening.

In this assembly 130, the support element 3 is made of an electrically conductive material. This support element 3 comprises the mounting zone 12 including the contact portions 9 intended to cooperate with the arms 4 of the holding member 1 and at least one reception zone 7*a*, 7*b* that is able to receive at least one element for blocking 11*a*, 11*b* a radial, axial and/or rotational movement of this support element 3 relative to the holding member 1. This support element 3 has a preferably circular section but this section may in one variant have the shape of a regular polygon including for example at least three sides and that may have rounded apices. It will be noted that the shape of the section of this support element 3 is preferably similar to that of the opening.

Figure 7:
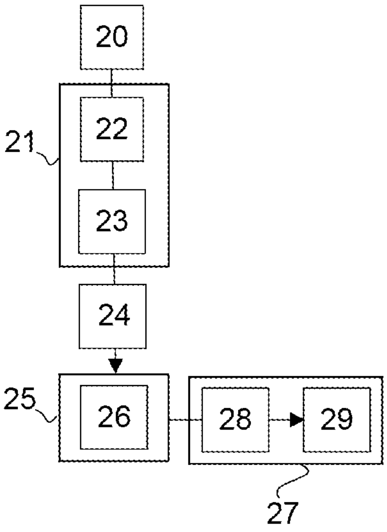
FIG. 7 is a flowchart relating to a method for producing such an assembly, according to the embodiment of the invention.

With reference to FIG. 7, the invention also relates to a method for producing the assembly 130 comprising the elastic holding member-timepiece component assembly 120 with the support element 3.

This method includes a step of mounting 20 said holding member 1 on the support element 3 delimiting/defining on the peripheral wall of an end of this support element 3 at least one zone for receiving 7*a*, 7*b* at least one element for blocking 11*a*, 11*b* a movement of said holding member 1 relative to said support element 3. In other words, this involves a step of mounting 20 said holding member 1 on the support element 3 helping to delimit/define on the peripheral wall of an end of this support element 3 at least one zone for receiving 7*a*, 7*b* at least one element for blocking 11*a*, 11*b* a movement of said holding member 1 relative to said support element 3. Additionally, this involves a step of mounting 20 said holding member 1 on the support element 3, said mounting step helping to define on the peripheral wall of one end of this support element 3 at least one zone for receiving 7*a*, 7*b* at least one element for blocking 11*a*, 11*b* a movement of said holding member 1 relative to said support element 3. Such as step 20 comprises a sub-step of inserting 21 the support element 3 into the holding member 1 with a minimal adjustment clearance. This sub-step 21 comprises a phase of indexing 22 the support element 3 in relation to the holding member 1. More specifically, during this phase 22, the end of the support element 3 comprising the mounting zone 12 is arranged in the opening defined by the free ends of the elastic arms 4 of the holding member 1. The arrangement of the support element 3 in this opening is performed about a common axis at the end of this support element 3 and at the opening of the holding member 1. This common axis is combined with the central axis D. Such an arrangement about this common axis contributes to an indexing of the end of the support element 3 in relation to the opening. The insertion sub-step 21 also comprises a phase of elastic tightening 23 of the support element 3 in the holding member 1 aiming to produce contact interfaces 8 between the holding member 1 and this support element 3. Indeed, during the insertion of the support element 3 into the opening, its end enters in contact with the elastic arms 4 that then deform radially in relation to the central axis of the opening until the contact portions 9 of the support element 3 are in contact with the contact faces of the elastic arms 4. In this configuration, the contact interfaces 8 between the holding member 1 and the support element 3 are created by the contact of the contact faces with the contact portions and the arrangement of the end in the opening is performed with a minimal adjustment clearance aiming to ensure a non-blocked or non-locked holding of the support element 3 in this opening of the holding member 1.

Subsequently, the method comprises a step of producing 24 by galvanic metal growth at least one blocking element 11*a*, 11*b* on at least one of the reception zones 7*a*, 7*b* of the mounting zone 12 of the support element 3. This step 24 comprises a sub-step of determining 25 the location of said at least one zone for receiving 7*a*, 7*b* at least one blocking element 11*a*, 11*b* in a mounting zone 12 of the support element 3. Indeed, the position of the reception zone 7*a*, 7*b* is defined according to at least one contact interface 8 between the holding member 1 and the support element 3. This determination sub-step 25 comprises a phase of identifying 26 zones for delimiting 10 the contact interfaces 8. These delimitation zones 10 correspond to portions of the mounting zone 12 of the support element 3 comprising the borders/limits of each contact interface 8. Indeed, the blocking elements 11*a*, 11 *b* are intended to be built on the reception zones 7*a*, 7*b* comprising these zones for delimiting 10 the contact interfaces 8 and this, preferably entirely or partly on or close to the borders/limits of each of these contact interfaces 8.

Consequently, the production step 24 comprises a sub-step of constructing 27 by galvanic metal growth at least one blocking element 11*a*, 11 *b* in at least one of the reception zones 7*a*, 7*b* located in the mounting zone 12 of the support element 3 comprising at least one identified delimitation zone 10. This galvanic growth on said at least one reception zone 7*a*, 7*b* is preferably thin and has a thickness between 0.5 and 20 μm, and is preferably of 3 μm.

Such a galvanic growth is performed only on the surface of the reception zone 7*a*, 7*b* of the support element 3, indeed no growth can occur on the free end of the elastic arms 4 of the holding member 1 manufactured from electrically insulating material.

Subsequently, the construction sub-step 27 comprises a phase of building 28 by this galvanic metal growth said at least one blocking element 11*a* in at least one reception zone 7*a* located in the mounting zone 12 of the support element 3 comprising identified zones 10 for delimiting two contact interfaces 8, these delimitation zones 10 being arranged facing one another. During this phase 28, the blocking element 11*a* is then built between two contact interfaces 8 or also between the two contact portions 9 of the mounting zone 12 of the support element 3 that are provided to cooperate with the contact faces of the free ends of the elastic arms 4. In one variant, two blocking elements 11*a* may be constructed just on the two determined delimitation zones 10 that are included in the corresponding reception zone 7*a*.

It is understood here that such a phase 28 therefore contributes to producing at least one element for blocking 11*a* the movement rotationally and/or radially of the support element 3 relative to the holding member 1.

The construction sub-step 27 also comprises a phase of forming 29 by galvanic metal growth said at least one blocking element 11*b* in at least one reception zone 7*b* located in the mounting zone 12 of the support element 3 comprising at least one identified zone for delimiting 10 at least one contact interface 8, said at least one delimitation zone 10 being arranged facing one of the two ends of the support element 3. During this phase 29, the blocking element 11*b* is then built on the reception zone 7*b* between a contact interface 8 and one of the two ends of the support element 3 or also between this end of the support element 3 and a contact portion 9 of the mounting zone 12 of the support element 3 that is provided to cooperate with the contact face of the free end of the elastic arm 4. In one variant, two blocking elements 11*b* may be constructed just on the two determined delimitation zones 10 that are included in the corresponding reception zone 7*b*, the two determined delimitation zones 10 being those that are arranged facing two corresponding ends of the support element 3.

It is understood here that such a phase 29 therefore contributes to producing at least one element for blocking 11*b* the axial and/or radial movement of the support element 3 relative to the holding member 1.

In the present embodiment, blocking elements 11*a*, 11*b* are built on all of the zones for delimiting 10 the contact interfaces 8 defined between the elastic arms 4 and the mounting zone 12 of the support element 3. It is understood that in other variants, such blocking elements 11*a*, 11*b* may only be constructed for a certain given number of contact interfaces 8 and/or delimitation zones 10 determined according for example to the type of blocking of the movement of the support element 3 relative to the holding member 1 to be configured.

The invention claimed is:

1. A method for producing a first assembly of a second assembly comprising an elastic holding member and a timepiece component with a support element, said elastic holding member being made of an elastic electrically insulating material having an aperture located at a central axis thereof, having first contact portions each having a face being configured to cooperate with respective second contact portions of the support element, and said support element being made of an electrically conductive material, the method comprising:
- mounting said second assembly on the support element, wherein the support element delimits on a peripheral wall of the support element at least one zone for receiving at least one element for blocking a movement of said elastic holding member relative to the support element,
- producing by galvanic metal growth said at least one blocking element on the at least one receiving zone, and
- making contact between the at least one blocking element and the face of at least one of the first contact portions of the elastic holding member in the aperture, the contact extending across the face of the at least one first contact portion, wherein
- the elastic holding member comprises flexible arms,
- each of the first contact portions is located at a distal end of one of the flexible arms,
- the elastic holding member, flexible arm and first contact portion are formed as a unitary member of the same elastic electrically insulating material.

2. The method according to claim 1, wherein the mounting comprises inserting the support element into the elastic holding member of the second assembly with a non-blocked holding of the support element in the elastic holding member.

3. The method according to claim 1, wherein the mounting comprises inserting and the inserting comprises a phase of elastic tightening of the support element in the elastic holding member to produce contact interfaces between the first contact portions of the elastic holding member and the support element by eccentric deformation of the flexible arms relative to the central axis.

4. The method according to claim 1, wherein the producing comprises determining a location of said at least one zone for receiving said at least one blocking element in a mounting zone of the support element.

5. The method according to claim 4, wherein the determining comprises a phase of identifying zones for delimiting contact interfaces.

6. The method according to claim 4, wherein the producing comprises constructing by galvanic metal growth said at least one blocking element in the at least one receiving zone located in the mounting zone of the support element, which comprises at least one identified delimitation zone.

7. The method according to claim 4, wherein the producing comprises constructing, the constructing comprising a phase of building by galvanic metal growth said at least one blocking element in the at least one receiving zone located in the mounting zone of the support element, which comprises identified zones for delimiting two contact interfaces, the delimitation zones being arranged facing one another.

8. The method according to claim 4, wherein the producing comprises a constructing, the constructing comprising a phase of forming by galvanic metal growth said at least one blocking element in at least one receiving zone located in the mounting zone of the support element, which comprises at least one identified zone for delimiting at least one contact interface, said at least one delimitation zone being arranged facing one of two ends of the support element.

9. The method according to claim 1, wherein the elastic holding member comprises a collet and the support element comprises a shaft.

10. The method according to claim 1, wherein the elastic holding member comprises upper and lower opposing faces, the method comprising mounting the elastic holding member on the support element such that galvanic metal growth contacts the elastic holding member in the central aperture between the upper and lower faces.

11. The method according to claim 1, wherein
- the elastic holding member is coupled to the support element via the first contact portions, and
- the flexible arms are configured to eccentrically deform relative to the central axis.

12. An assembly for a horological movement of a timepiece comprising:
- a first assembly comprising an elastic holding member and a timepiece component, and
- a support element having first contact portions,
- said elastic holding member being made of an electrically insulating material and having an aperture located at a central axis thereof and second contact portions configured to respectively cooperate with the first portions, the second contact portions each having a face,
- the support element being made of an electrically conductive material, and
- the first assembly being coupled with the support element from at least one blocking element included on at least one reception zone of the support element and in contact with the elastic holding member in the aperture such that at least one blocking element is in contact with and the contact extends across the face of at least one of the second contact portions, wherein
- the elastic holding member comprises flexible arms,
- each of the second contact portions is located at a distal end of one the flexible arms, and
- the elastic holding member, flexible arms and second contact portions are formed as a unitary member of the same elastic electrically insulating material.

13. A horological movement, comprising:
at least one of the assembly according to claim 12.

14. A timepiece comprising:
the horological movement according to claim 13.

* * * * *